United States Patent
McMahan et al.

(10) Patent No.: US 10,657,461 B2
(45) Date of Patent: May 19, 2020

(54) COMMUNICATION EFFICIENT FEDERATED LEARNING (71) Applicant: Google LLC, Mountain View, CA (US)

(72) Inventors: Hugh Brendan McMahan, Seattle, WA (US); Dave Morris Bacon, Seattle, WA (US); Jakub Konecny, Edinburgh (GB); Xinnan Yu, Forest Hills, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/335,695

(22) PCT Filed: Sep. 7, 2017

(86) PCT No.: PCT/US2017/050433
§ 371 (c)(1),
(2) Date: Mar. 22, 2019

(87) PCT Pub. No.: WO2018/057302
PCT Pub. Date: Mar. 29, 2018

(65) Prior Publication Data
US 2019/0340534 A1 Nov. 7, 2019

Related U.S. Application Data (60) Provisional application No. 62/400,019, filed on Sep. 26, 2016.

(51) Int. Cl.
*G06N 20/00* (2019.01)
*H04L 29/06* (2006.01)
(Continued)

(52) U.S. Cl.
CPC .............. *G06N 20/00* (2019.01); *G06F 17/16* (2013.01); *G06F 17/18* (2013.01); *G06N 7/005* (2013.01); *H04L 67/42* (2013.01); *G06F 7/582* (2013.01)

(58) Field of Classification Search
None
See application file for complete search history.

(56) References Cited

U.S. PATENT DOCUMENTS 6,687,653 B1  2/2004  Kurien et al.
6,708,163 B1  3/2004  Kargupta et al.
(Continued)

FOREIGN PATENT DOCUMENTS

WO  WO 2015126858  8/2015

OTHER PUBLICATIONS

Nedic et al. On Distributed Averaging Algorithms and Quantization Effects, IEEE Trans. on Automatic Control, 2009, pp. 2506-2517.*
(Continued)

*Primary Examiner* — Li Wu Chang
(74) *Attorney, Agent, or Firm* — Dority & Manning, P.A.

(57) ABSTRACT

The present disclosure provides efficient communication techniques for transmission of model updates within a machine learning framework, such as, for example, a federated learning framework in which a high-quality centralized model is trained on training data distributed overt a large number of clients each with unreliable network connections and low computational power. In an example federated learning setting, in each of a plurality of rounds, each client independently updates the model based on its local data and communicates the updated model back to the server, where all the client-side updates are used to update a global model. The present disclosure provides systems and methods that reduce communication costs. In particular, the present disclosure provides at least: structured update approaches in which the model update is restricted to be small and sketched update approaches in which the model update is compressed before sending to the server.

9 Claims, 5 Drawing Sheets (51) Int. Cl.
G06F 17/16 (2006.01)
G06F 17/18 (2006.01)
G06N 7/00 (2006.01)
G06F 7/58 (2006.01)

(56) References Cited

U.S. PATENT DOCUMENTS

| | | | |
|---|---|---|---|
| 6,879,944 | B1 | 4/2005 | Tipping et al. |
| 7,069,256 | B1 | 6/2006 | Campos |
| 7,664,249 | B2 | 2/2010 | Horvitz et al. |
| 8,018,874 | B1 | 9/2011 | Owechko |
| 8,239,396 | B2 | 8/2012 | Byun et al. |
| 8,321,412 | B2 | 11/2012 | Yang et al. |
| 8,429,103 | B1 | 4/2013 | Aradhye et al. |
| 8,954,357 | B2 | 2/2015 | Faddoul et al. |
| 9,190,055 | B1 | 11/2015 | Kiss et al. |
| 9,275,398 | B1 | 3/2016 | Kumar et al. |
| 9,336,483 | B1 | 5/2016 | Abeysooriya et al. |
| 9,390,370 | B2 | 7/2016 | Kingsbury |
| 9,424,836 | B2 | 8/2016 | Lee et al. |
| 2005/0138571 | A1 | 6/2005 | Keskar et al. |
| 2006/0224579 | A1 | 10/2006 | Zheng |
| 2008/0209031 | A1 | 8/2008 | Zhu et al. |
| 2010/0132044 | A1 | 5/2010 | Kogan et al. |
| 2011/0085546 | A1 | 4/2011 | Capello et al. |
| 2012/0016816 | A1 | 1/2012 | Yanase et al. |
| 2012/0226639 | A1 | 9/2012 | Burdick et al. |
| 2012/0310870 | A1 | 12/2012 | Caves et al. |
| 2014/0214735 | A1 | 7/2014 | Harik |
| 2015/0186798 | A1 | 7/2015 | Vasseur et al. |
| 2015/0193695 | A1 | 7/2015 | Cruz Mota et al. |
| 2015/0195144 | A1 | 7/2015 | Vasseur et al. |
| 2015/0242760 | A1 | 8/2015 | Miao et al. |
| 2015/0324690 | A1 | 11/2015 | Chilimbi et al. |
| 2018/0075347 | A1* | 3/2018 | Alistarh ................ G06N 3/084 |

OTHER PUBLICATIONS

International Preliminary Report on Patentability for PCT/US2017/050433, dated Sep. 24, 2018, 16 pages.
International Search Report and Written Opinion for PCT/US2017/050433, dated Nov. 23, 2017, 13 pages.
Ailon et al., "Approximate Nearest Neighbors and the Fast Johnson-Lindenstrauss Transform", 38th Annual ACM Symposium on Theory of Computing, Seattle, Washington, May 21-23, 2006, 7 pages.
Alistarh et al., "QSGB: Randomized Quantization for Communication-Optimal Stochastic Gradient Descent", arXiv:610.02132v1, Oct. 7, 2016, 22 pages.
Al-Rfou et al., "Conversational Contextual Cues: The Case of Personalization and History for Response Ranking", arXiv:1606.00372v1, Jun. 1, 2016, 10 pages.
Arjevani et al., "Communication Complexity of Distributed Convex Learning and Optimization", Neural Information Processing Systems, Montreal, Canada, Dec. 7-12, 2015, 9 pages.
Balcan et al., "Distributed Learning, Communication Complexity and Privacy", Conference on Learning Theory, Edinburgh, Scotland, Jun. 25-27, 2012.
Bonawitz et al., "Practical Secure Aggregation for Federated Learning on User-Held Data", arXiv1611.04482v1, Nov. 14, 2016, 5 pages.
Braverman et al., "Communication Lower Bounds for Statistical Estimation Problems via a Distributed Data Processing Inequality", 48th Annual ACM Symposium on Theory of Computing, Cambridge, Massachusetts, Jun. 19-21, 2016, pp. 1011-1020, 11 pages.
Chaudhuri et al., "Differentially Private Empirical Risk Minimization", Journal of Machine Learning Research, vol. 12, Jul. 12, 2011, pp. 1069-1109.
Chen et al., "Communication-Optimal Distributed Clustering", Neural Information Processing Systems, Barcelona, Spain, Dec. 5-10, 2016, 9 pages.
Chen et al., "Revisiting Distributed Synchronous SGD", arXiv:1604.00981v3, Mar. 21, 2017, 10 pages.
Chilimbi et al., "Project Adam: Building an Efficient and Scalable Deep Learning Training System", 11th USENIX Symposium on Operating Systems Design and Implementation, Broomfield, Colorado, Oct. 6-8, 2014, pp. 571-582.
Dasgupta et al., "An Elementary Proof of a Theorem of Johnson and Lindenstrauss", Random Structures & Algorithms, vol. 22, Issue 1, 2003, pp. 60-65.
Dean et al., "Large Scale Distributed Deep Networks", Neural Information Processing Systems, Dec. 3-8, 2012, Lake Tahoe, 9 pages.
Denil et al., "Predicting Parameters in Deep Learning",26th International Conference on Neural Information Processing Systems, Lake Tahoe, Nevada, Dec. 5-10, 2013, pp. 2148-2156.
Duchi et al., "Privacy Aware Learning", arXiv:1210.2085v2, Oct. 10, 2013, 60 pages.
Dwork et al., "The Algorithmic Foundations of Differential Privacy", Foundations and Trends in Theoretical Computer Science, vol. 9, Nos. 3-4, 2014, pp. 211-407.
Efron et al., "The Jackknife Estimate of Variance", The Annals of Statistics, vol. 9, Issue 3, May 1981, pp. 586-596.
Elias, "Universal Codeword Sets and Representations of the Integers", IEEE Transactions on Information Theory, vol. 21, Issue 2, Mar. 1975, pp. 194-203.
Falahatgar et al., "Universal Compression of Power-Law Distributions", arXiv:1504.08070v2, May 1, 2015, 20 pages.
Fercoq et al., "Fast Distributed Coordinate Descent for Non-Strongly Convex Losses", arXiv:1405.5300v1, May 21, 2014, 6 pages.
Gamal et al., "On Randomized Distributed Coordinate Descent with Quantized Updates", arXiv:1609.05539v1, Sep. 18, 2016, 5 pages.
Garg et al., "On Communication Cost of Distributed Statistical Estimation and Dimensionality", Neural Information Processing Systems, Montreal, Canada, Dec. 8-13, 2014, 9 pages.
Golovin et al., "Large-Scale Learning with Less Ram via Randomization", arXiv:1303.4664v1, Mar. 19, 2013, 10 pages.
Han et al., "Deep Compression: Compressing Deep Neural Networks with Pruning, Trained Quantization and Huffman Coding", arXiv:1510.00149v5, Nov. 20, 2015, 13 pages.
Ho et al., "More Effective Distributed ML via a Stale Synchronous Parallel Parameter Server", Neural Information Processing Systems, Dec. 5-10, 2013, Lake Tahoe, 9 pages.
Horadam, "Hadamard Matrices and Their Applications", Princeton University Press, 2007.
Jaggi et al., "Communication-Efficient Distributed Dual Coordinate Ascent", arXiv:1409.1458v2, Sep. 29, 2014, 15 pages.
Johnson et al., "Accelerating Stochastic Gradient Descent Using Predictive Variance Reduction" Advances in Neural Information Processing Systems, Lake Tahoe, Nevada, Dec. 5-10, 2013, pp. 315-323.
Konecny et al., "Federated Optimization: Distributed Machine Learning for On-Device Intelligence", arXiv:1610.02527v1, Oct. 8, 2016, 38 pages.
Konecny et al., "Federated Optimization: Distributed Optimization Beyond the Datacenter", arXiv:1511.03575v1, Nov. 11, 2015, 5 pages.
Konecny et al., "Federated Learning: Strategies for Improving Communication Efficiency", arXiv:610.05492v1, Oct. 18, 2016, 5 pages.
Konecny et al., "Randomized Distributed Mean Estimation: Accuracy vs. Communication", arXiv:1611.07555v1, Nov. 22, 2016, 19 pages.
Konecny et al., "Semi-Stochastic Gradient Descent Methods", arXiv:1312.1666v1, Dec. 5, 2013, 19 pages.
Krichevsky et al., "The Performance of Universal Encoding", IEEE Transactions on Information Theory, vol. 27, Issue 2, Mar. 1981, pp. 199-207.
Krizhevsky, "Learning Multiple Layers of Features from Tiny Images", Techncal Report, Apr. 8, 2009, 60 pages.
Krizhevsky, "One Weird Trick for Parallelizing Convolutional Neural Networks", arXiv:1404.59997v2, Apr. 26, 2014, 7 pages.

(56) References Cited

OTHER PUBLICATIONS

Kumar et al., "Fugue: Slow-Worker-Agnostic Distributed Learning for Big Models on Big Data", Journal of Machine Learning Research: Workshop and Conference Proceedings, Apr. 2014, 9 pages.
Livni et al., "An Algorithm for Training Polynomial Networks", arXiv:1304.7045v1, Apr. 26, 2013, 22 pages.
Livni et al., "On the Computational Efficiency of Training Neural Networks" arXiv:1410.1141v2, Oct. 28, 2014, 15 pages.
Lloyd, "Least Squares Quantization in PCM", IEEE Transactions on Information Theory, vol. 28, Issue 2, Mar. 1982, pp. 129-137.
Ma et al., "Adding vs. Averaging in Distributed Primal-Dual Optimization", arXiv:1502.03508v2, Jul. 3, 2015, 19 pages.
Ma et al., "Distributed Optimization with Arbitrary Local Solvers", arXiv:1512.04039v2, Aug. 3, 2016, 38 pages.
MacKay, "Information Theory, Inference and Learning Algorithms", Cambridge University Press, 2003.
McDonald et al., "Distributed Training Strategies for the Structures Perceptron", Human Language Technologies: The 2010 Annual Conference of the North American Chapter of the Association for Computational Linguistics, Los Angeles, California, Jun. 2-4, 2010, 9 pages.
McMahan et al., "Communication-Efficient Learning of Deep Networks from Decentralized Data", arXiv:1602.05629v3, Feb. 28, 2017, 11 pages.
McMahan et al., "Federated Learning: Collaborative Machine Learning without Centralized Training Data", Apr. 6, 2017, https://research.googleblog.com/2017/04/federated-learning-collaborative.html, retrieved on Oct. 3, 2018, 5 pages.
McMahan et al., "Federated Learning of Deep Networks using Model Averaging", arXiv:1602.05629, Feb. 17, 2016, 11 pages.
Povey et al., "Parallel Training of Deep Neural Networks with Natural Gradient and Parameter Averaging", arVix:1410.7455v1, Oct. 27, 2014, 21 pages.
Qu et al., "Coordinate Descent with Arbitrary Sampling I: Algorithms and Complexity", arXiv:1412.8060v2, Jun. 15, 2015, 32 pages.
Qu et al., Quartz: Randomized Dual Coordinate Ascent with Arbitrary Sampling, arXiv:1411.5873v1, Nov. 21, 2014, 34 pages.
Rabbat et al., "Quantized Incremental Algorithms for Distributed Optimization", Journal on Selected Areas in Communications, vol. 23, No. 4, 2005, pp. 798-808.
Reddi et al., "AIDE: Fast and Communication Efficient Distributed Optimization", arXiv:1608.06879v1, Aug. 24, 2016, 23 pages.
Richtarik et al., "Distributed Coordinate Descent Method for Learning with Big Data", arXiv:1310.2059v1, Oct. 8, 2013, 11 pages.
Seide et al., "1-Bit Stochastic Gradient Descent and Application to Data-Parallel Distributed Training of Speech DNNs", 15th Annual Conference of the International Speech Communication Association, Singapore, Sep. 14-18, 2014, pp. 1058-1062.
Shamir et al., "Communication-Efficient Distributed Optimization Using an Approximate Newton-Type Method", arXiv1312.7853v4, May 13, 2013, 22 pages.
Shamir et al., "Distributed Stochastic Optimization and Learning", 52nd Annual Allerton Conference on Communication, Control, and Computing, Monticello, Illinois, Oct. 1-3, 2014, pp. 850-857.
Shokri et al., "Privacy-Preserving Deep Learning" Proceedings of the 22nd ACM SIGSAC Conference on Computer and Communications Security, Denver, Colorado, Oct. 12-16, 2015, 12 pages.
Springenberg et al., "Striving for Simplicity: The All Convolutional Net", arXiv:1412.6806v3, Apr. 13, 2015, 14 pages.
Suresh et al., "Distributed Mean Estimation with Limited Communication", arXiv.1611.00429v3, Sep. 25, 2017, 17 pages.
Tsitsiklis et al., "Communication Complexity of Convex Optimization", Journal of Complexity, vol. 3, Issue 3, Sep. 1, 1987, pp. 231-243.
Wikipedia, "Rounding", https://en.wikipedia.org/wiki/Rounding, retrieved on Aug. 14, 2017, 13 pages.
Woodruff, "Sketching as a Tool for Numerical Linear Algebra", arXiv:1411.4357v3, Feb. 10, 2015, 139 pages.
Xie et al., "Distributed Machine Learning via Sufficient Factor Broadcasting", arXiv:1409.5705v2, Sep. 7, 2015, 15 pages.
Xing et al., "Petuum: A New Platform for Distributed Machine Learning on Big Data", Conference on Knowledge Discovery and Data Mining, Aug. 10-13, 2015, Hilton, Sydney, 10 pages.
Yadan et al., "Multi-GPU Training of ConvNets", International Conference on Learning Representations, Apr. 14-16, 2014, Banff, Canada, 4 pages.
Yang, "Trading Computation for Communication: Distributed Stochastic Dual Coordinate Ascent", Advances in Neural Information Processing Systems, Lake Tahoe, Nevada, Dec. 5-10, 2013, pp. 629-637.
Yu et al., "Circulant Binary Embedding", arXiv:1405.3162v1, May 13, 2014, 9 pages.
Yu et al., "Orthogonal Random Features", Neural Information Processing Systems, Barcelona, Spain, Dec. 5-10, 2016, 9 pages.
Zhang et al., "Communication-Efficient Algorithms for Statistical Optimization", arXiv.1209.4129v3, Oct. 11, 2013, 44 pages.
Zhang et al., "Communication-Efficient Distributed Optimization of Self Concordant Empirical Loss", arXiv:1501.00263v1, Jan. 1, 2015, 46 pages.
Zhang et al., "DISCO: Distributed Optimization for Self-Concordant Empirical Loss", 32nd International Conference on Machine Learning, vol. 37, 2015, pp. 362-370.
Zhang et al., "Information—Theoretic Lower Bounds for Distributed Statistical Estimation with Communication Constraints", Neural Information Processing Systems, Lake Tahoe, Nevada, Dec. 5-10, 2013, 9 pages.
Zhang et al., "Poseidon: A System Architecture for Efficient GPU-based Deep Learning on Multiple Machines", arXiv:1512.06216v1, Dec. 19, 2015, 14 pages.

* cited by examiner

COMMUNICATION EFFICIENT FEDERATED LEARNING

PRIORITY CLAIM

The present application is based on and claims priority to Patent Cooperation Treaty Application PCT/US2017/050433 having a filing date of Sep. 26, 2016 and U.S. Provisional Application 62/400,019 having a filing date of Sep. 7, 2017. Applicant claims priority to and the benefit of each of such applications and incorporate all such applications herein by reference in its entirety.

FIELD

The present disclosure relates generally to machine learning. More particularly, the present disclosure relates to communication efficient federated learning.

BACKGROUND

As datasets grow larger and models more complex, machine learning increasingly requires distributing the optimization of model parameters over multiple machines. Existing machine learning algorithms are typically only applicable to controlled environments (such as data centers) where the data is properly distributed among machines, and high-throughput fiber networks are available.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for communication efficient machine learning. The method includes obtaining, by a client computing device, global values for a set of parameters of a machine-learned model. The method includes training, by the client computing device, the machine-learned model based at least in part on a local dataset to obtain an update matrix that is descriptive of updated values for the set of parameters of the machine-learned model. The update matrix is restricted to have a pre-defined structure. The local dataset is stored locally by the client computing device. The method includes communicating, by the client computing device, information descriptive of the update matrix to a server computing device.

Another example aspect of the present disclosure is directed to a client computing device. The client device includes at least one processor and at least one non-transitory computer-readable medium that stores instructions that, when executed by the at least one processor, cause the client computing device to perform operations. The operations include obtaining global values for a set of parameters of a machine-learned model. The operations include training the machine-learned model based at least in part on a local dataset to obtain an update matrix that is descriptive of updated values for the set of parameters of the machine-learned model. The local dataset is stored locally by the client computing device. The operations include encoding the update matrix to obtain an encoded update. The operations include communicating the encoded update to a server computing device.

Another example aspect of the present disclosure is directed to at least one non-transitory computer-readable medium that stores instructions that, when executed by a client computing device, cause the client computing device to perform operations. The operations include obtaining global values for a set of parameters of a machine-learned model. The operations include training the machine-learned model based at least in part on a local dataset to obtain an update matrix that is descriptive of updated values for the set of parameters of the machine-learned model. The local dataset is stored locally by the client computing device The update matrix is restricted to be at least one of a low-rank matrix and a sparse matrix. The operations include encoding the update matrix to obtain an encoded update. The operations include communicating the encoded update to a server computing device.

Other aspects of the present disclosure are directed to various systems, apparatuses, non-transitory computer-readable media, user interfaces, and electronic devices.

Particular embodiments of the subject matter described in this specification can be implemented so as to realize one or more of the following technical effects. For example, in various implementations, efficient processing may be achieved by training a machine-learned model locally at a plurality of client computing devices (e.g. user mobile devices), thereby leveraging the computational power of a plurality of devices. Furthermore, by training a machine-learned model by a client computing device based on a local dataset, the security of the training process can be improved. This is because, for example, the information of the model update is less sensitive than the data itself. User data that is privacy sensitive remains at the user's computing device and is not uploaded to the server. Instead, only the less sensitive model update is transmitted.

Moreover, due to the asymmetric property of internet connections, the uplink from client to server may be slower than the downlink from the server to the client, so that transmission of a full, unrestricted, model by each client device can be inefficient. However, by restricting the update matrix to have a pre-defined structure in accordance with various embodiments (e.g. by restricting the update matrix to be at least one of a low rank matrix and a sparse matrix), more efficient communication within a machine learning framework is achieved, e.g. from a network perspective, from a client device workload/resource perspective, and/or from the perspective of attempting to perform as many rounds of learning/update as quickly as possible.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Introduction

Generally, the present disclosure provides systems and methods that perform efficient communication within a machine learning framework. For example, the efficient communication techniques provided herein can be implemented within the context of a federated learning framework. However, the efficient communication techniques provided herein can be implemented in other machine learning frameworks as well. For example, the efficient communication techniques provided herein can be implemented in any instance in which a first computing device is tasked with computing an update to a model and/or communicating the update of the model to a second computing device.

More particularly, federated learning is a machine learning framework that enables training of a high-quality centralized model based on training data distributed over a large number of client computing devices. The clients typically have low computational power and/or slow/unstable connections to the network. Federated learning may also be referred to as "federated optimization" in certain instances.

A motivating example for federated learning arises when the training data is kept locally on users' mobile computing devices and such mobile computing devices are used as nodes for performing computation on their local data in order to update a global model. Thus, the federated learning framework differs from conventional distributed machine learning due to the large number of clients, data that is highly unbalanced and not independent and identically distributed ("IID"), and unreliable network connections.

Federated learning offers several distinct advantages compared to performing learning at a centralized server. For example, information of the model update is less sensitive that the data itself. Thus, user data that is privacy sensitive remains at the user's computing device and is not uploaded to the server. Instead, only the less sensitive model update is transmitted. As another advantage, federated learning leverages the computational power of a large number of computing devices (e.g., user mobile devices). In addition, a slight modification of the framework described above can lead to creation and use of personalized models for each user at their respective device.

In some implementations, systems implementing federated learning can perform the following actions in each of a plurality of rounds of model optimization: a subset of clients are selected; each client in the subset updates the model based on their local data; the updated models or model updates are sent by each client to the server; the server aggregates the updates (e.g., by averaging the updates) and improves the global model; and the server redistributes the global model to all the clients. Performing a plurality of rounds of the above actions iteratively improves the global model based on training data stored at the client devices.

In a basic implementation of the above framework, each client device sends a full model back to the server in each round. However, transmission of the full model by each client device is significantly "expensive" (e.g., from a network perspective, from a client device workload/resource perspective, and/or from the perspective of attempting to perform as many rounds of learning/update as quickly as possible). In particular, due to the asymmetric property of internet connections, the uplink from client to server is typically much slower than the downlink from the server to the client.

In view of such significant upload costs, the present disclosure provides systems and methods that perform efficient communication within a machine learning framework (e.g., within the federated learning framework discussed above). In particular, the present disclosure provides efficient communication techniques that reduce the cost of communicating the updated model or model update from the client device to the server.

More particularly, the present disclosure provides communication efficient approaches that include: structured update approaches in which the model update is restricted to be small and sketched update approaches in which the model update is compressed before sending to the server. These approaches can be combined for example, by first learning a structured update and then sketching it.

Example Model Update Notation

Prior to discussing the communication efficient approaches provided by the present disclosure, a basic implementation of model updates in a federated learning environment will be discussed and notation will be introduced.

In an example federated learning framework, an objective is to learn a model with parameters embodied in a real matrix $W \in \mathbb{R}^{d_1 \times d_2}$. As examples, the model can include one or more neural networks (e.g., deep neural networks, recurrent neural networks, convolutional neural networks, etc.) or other machine-learned models.

In round t≥0, the server distributes the current model $W_t$ to a subset $S_t$ of $n_t$ clients (for example, to a selected subset of clients whose devices are plugged into power, have access to broadband, and are idle). Some or all of these clients independently update the model based on their local data. The updated local models are $W_t^1, W_t^2, \ldots, W_t^n$. Let the updates be:

$$H_t^i = W_t^i - W_t, i \in S_t.$$

Each client then sends the update back to the server, where the global update is computed by aggregating all the client-side updates. For example, one aggregation scheme can be as follows:

$$W_{t+1} = W_t + \eta_t H_t, \; H_t := \frac{1}{n_t} \sum_{i \in S_t} H_t^i.$$

In addition, in some implementations, a weighted sum might be used to replace the average based on desired performance. The server can also choose the learning rate $\eta_t$. For example, careful choice of the server-side learning rate can lead to faster convergence. However, in at least one example, $\eta_t=1$ and no weighting is used.

In implementations in which deep learning is performed, a separate matrix W can be used to represent the parameters of each layer. Thus, each reference herein to a matrix (e.g., a model parameter matrix $W_t^i$ or an update matrix $H_t^i$) should be understood as not being limited to a single matrix but instead refer to one or more matrices that may be used to represent a given model or update to such model. For example, a neural network with five layers can have five model parameter matrices W that respectively represent the parameters of such layers, and five update matrices $H_t^i$ that respectively represent updates to the parameters of such layers.

In many instances, W and $H_t^i$ are 2D matrices. W can be right-multiplied, e.g., $d_1$ and $d_2$ represent the output and input dimensions respectively. For example, the parameters of a fully connected layer form a 2D matrix by itself. However, the kernel of a convolutional layer is a 4D tensor of the shape # input×width×height×# output. In such case, W can be reshaped from the kernel to be of shape (# input× width×height)×# output.

According to aspects of the present disclosure, communication efficient techniques are provided that reduce the cost of sending $H_t^i$ to the server. In particular, the present disclosure provides communication efficient approaches that include: structured update approaches in which $H_t^i$ is restricted to be small or otherwise conform to a certain structure and sketched update approaches in which $H_t^i$ is compressed or otherwise encoded before sending to the server.

Example Structured Update Techniques

A first type of communication efficient update provided by the present disclosure is a structured update in which $H_t^i$ has a pre-defined structure. In particular, two types of structured update techniques will be described in further detail: a low-rank technique and a random mask technique.

In the low-rank structured update technique, each update $H_t^i$ can be constrained or enforced to be a low-rank matrix (e.g., a low-rank matrix of at most rank k, where k is a fixed number). In some implementations, restricting the update $H_t^i$ to be a low-rank matrix can be accomplished by expressing $H_t^i$ as the product of two matrices.

As an example, $H_t^i \in \mathbb{R}^{d_1 \times d_2}$ is a low-rank matrix with rank k. The update $H_t^i$ can be expressed as the product of two matrices: $H_t^i = A_t^i B_t^i$, $A_t^i \in \mathbb{R}^{d_1 \times k}$, $B_t^i \in \mathbb{R}^{k \times d_2}$, where $A_t^i$ is generated randomly and fixed, and $B_t^i$ is optimized. In some implementations, the client device only needs to send $B_t^i$ to the server, since $A_t^i$ can be generated or otherwise known by the server. In particular, in some implementations, both the client and the server can have knowledge of a synchronized random seed. The client and the server can each use the random seed (e.g., along with a pseudo-random number generator) to separately produce $A_t^i$. Thus, the client device only needs to send $B_t^i$ to the server, since the server can reproduce $H_t^i$ using the locally generated $A_t^i$ and the $B_t^i$ received from the client.

In some implementations, fixing $B_t^i$ (e.g., randomly or deterministically) is also an option.

In some implementations, the low-rank structured update technique can provide a compression ratio of $k/d_1$. In one example, the seed can be 32 bits long.

In the random mask structured update technique, each update $H_t^i$ can be constrained or restricted to be a sparse matrix. For example, each sparse matrix can follow a predefined sparsity pattern (e.g., a predefined random sparsity pattern such as a random mask). In some implementations, a different sparsity pattern is generated for each round and/or for each client within each round.

Similar to the low-rank approach, the sparse pattern can be fully specified or otherwise generated based on a random seed. Therefore, the client device is only required to send the values of the non-zero entries of $H_t^i$. For example, a server that also has knowledge of the seed can generate the sparsity pattern and, based on such pattern, determine which communicated values correspond to which parameters.

Example Sketched Update Techniques

A second type of communication efficient update provided by the present disclosure is a sketched update in which the client encodes the update $H_t^i$ in a compressed form prior to sending to the server. The client device can compute the full update $H_t^i$ and then encode the update or can compute the update $H_t^i$ according to a structured technique and then encode such structured update. The server can decode the update before aggregation.

Many different types of encoding or compression are envisioned by the present disclosure. For example, the compression can be lossless compression or lossy compression. Two example encoding techniques are described in further detail below: a subsampling technique and a quantization technique.

One way of encoding the updates is by sampling only a random subset of the parameters described by an update. Stated differently, instead of communicating the full update $H_t^i$, each client device can communicate matrix $\hat{H}_t^i$, which includes only a subset of the values of $H_t^i$. For example, the subset of values of $H_t^i$ can be a random subset of scaled values of $H_t^i$.

The server then aggregates the sampled updates (e.g., through averaging), producing the global update $\hat{H}_t$. Sampling in a random fashion has the property that the average of the sampled updates is an unbiased estimator of the true average: $\mathbb{E}[\hat{H}_t] = H_t$.

In some implementations, the portion of parameters that are sampled can be selected through use of a random mask, for example, as described above. In particular, a seed can be used to form a parameter mask that identifies which parameters are sampled. A different mask can be generated for each round and/or for each client within each round. The mask itself can be stored as a synchronized seed. Perturbing the expected iterates of SGD by a random matrix of zero mean, which is what certain implementations of the subsampling strategy would do, does not affect this type of convergence.

Another way of encoding the updates is by quantizing the weights. For example, the weights can be probabilistically quantized.

First, an algorithm for quantizing each scalar value to 1 bit will be described. Consider the update $H_t^i$, let $h=(h_1, \ldots, h_{d_1 \times d_2})=\text{vec}(H_t^i)$, and let $h_{max}=\max_j (h_j)$, $h_{min}=\min_j (h_j)$. Let the compressed update of h be $\tilde{h}$, which can be generated as follows:

$$\tilde{h}_j = \begin{cases} h_{max}, \text{ with probability } \dfrac{h_j - h_{min}}{h_{max} - h_{min}} \\ h_{min}, \text{ with probability } \dfrac{h_{max} - h_j}{h_{max} - h_{min}} \end{cases}$$

It is easy to show that $\tilde{h}$ is an unbiased estimation of h. When the uncompressed scalar values are described in 4 byte float, the 1 bit method described above provides 32× of compression.

Further, the above can be generalized to more than 1 bit for each scalar. For example, for b-bit quantization, $[h_{min}, h_{max}]$ can be equally divided into $2^b$ intervals. Suppose $h_i$ falls in the interval bounded by h' and h". The quantization can operate by replacing $h_{min}$ and $h_{max}$ in the above equation with h' and h", respectively.

In some implementations, the intervals are not necessarily evenly spaced, but instead can be dynamically spaced. For implementations that use dynamically spaced intervals, a table that identifies the max/min values for each interval can be provided by the client to the server. The client will typically transmit the min and max to the server regardless of whether dynamic spacing is used or not. In some implementations, incremental, randomized, and/or distributed optimization algorithms can be similarly used in the quantized updates setting.

According to another aspect of the present disclosure, the quantization techniques described above can be improved through the use of random rotations. More particularly, the above 1-bit and multi-bit quantization approaches work best when the scalars are approximately equal across different dimensions. As an example, when max=100 and min=−100 and most of the values are 0, the 1-bit quantization will lead to large quantization error.

As such, according to an aspect of the present disclosure, performance of a random rotation of h before the quantization can resolve this issue. For example, the update can be multiplied by an invertible matrix R. For example, the rotation matrix can be an orthogonal matrix. Randomly rotating h before the quantization can more evenly distribute the scalar values across the intervals. In the decoding phase, the server can perform the inverse rotation before aggregating all the updates.

In some implementations, the dimension of h can be as high as d=1M, and it is computationally prohibitive to generate ($\mathcal{O}(d^3)$) and apply ($\mathcal{O}(d^2)$) to a rotation matrix. As such, according to another aspect of the present disclosure, a structured rotation matrix can be used. For example, the structured rotation matrix may not require explicit construction by the client computing device, but instead has a defined structure that enables computation using R without explicit construction. For example, the structured rotation matrix can be a product of a Walsh-Hadamard matrix and a binary diagonal matrix. This can reduce the computational complexity of generating and applying the matrix to $\mathcal{O}(d)$ and $\mathcal{O}(d \log d)$.

In some implementations, the same rotation matrix is used for all client devices and/or for all rounds. In some implementations, the server can then perform some aggregation on the updates prior to inverse rotation of the aggregated update. In some implementations, the server decodes each update prior to aggregation.

Example Systems

Figure 1:
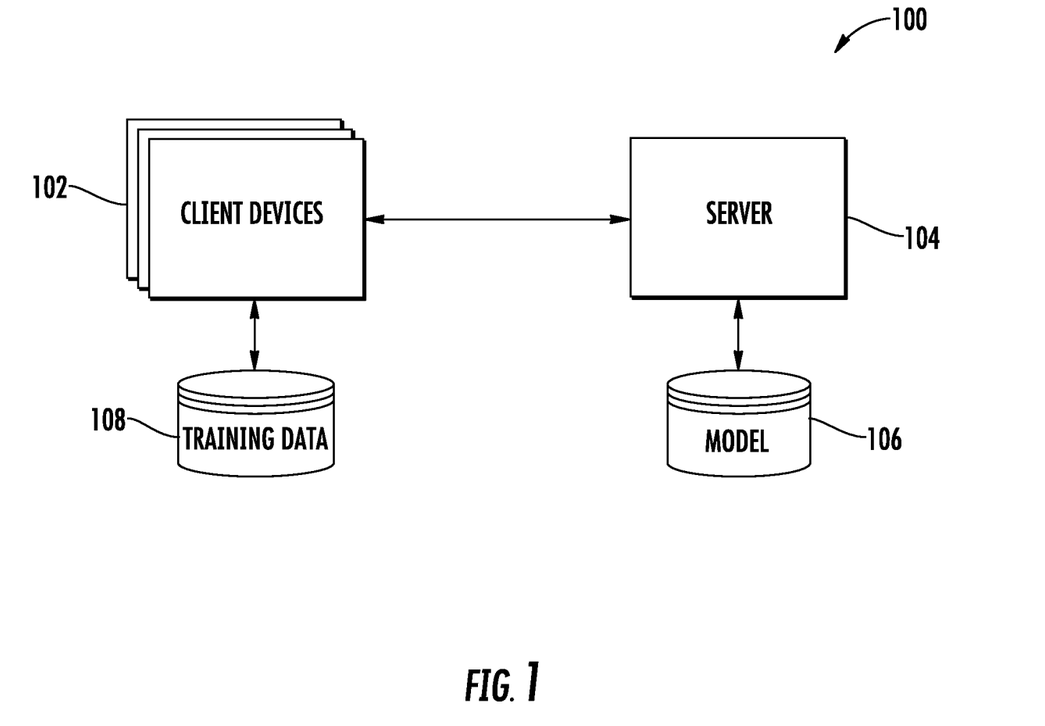
FIG. 1 depicts a block diagram of an example computing system according to example embodiments of the present disclosure.

FIG. 1 depicts an example system 100 for training one or more global machine learning models 106 using respective training data 108 stored locally on a plurality of client devices 102. System 100 can include a server device 104. Server 104 can be configured to access machine learning model 106, and to provide model 106 to a plurality of client devices 102. Model 106 can be, for instance, a linear regression model, logistic regression model, a support vector machine model, a neural network (e.g. convolutional neural network, recurrent neural network, etc.), or other suitable model. In some implementations, sever 104 can be configured to communicate with client devices 102 over one or more networks.

Client devices 102 can each be configured to determine one or more local updates associated with model 106 based at least in part on training data 108. For instance, training data 108 can be data that is respectively stored locally on the client devices 106. The training data 108 can include audio files, image files, video files, a typing history, location history, and/or various other suitable data. In some implementations, the training data can be any data derived through a user interaction with a client device 102.

Further to the descriptions above, a user may be provided with controls allowing the user to make an election as to both if and when systems, programs or features described herein may enable collection, storage, and/or use of user information (e.g., training data 108), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Although training data 108 is illustrated in FIG. 1 as a single database, the training data 108 consists of data that is respectively stored at each device 102. Thus, in some implementations, the training data 108 is highly unbalanced and not independent and identically distributed.

Client devices 102 can be configured to provide the local updates to server 104. As indicated above, training data 108 may be privacy sensitive. In this manner, the local updates can be performed and provided to server 104 without compromising the privacy of training data 108. For instance, in such implementations, training data 108 is not provided to server 104. The local update does not include training data 108. In some implementations in which a locally updated model is provided to server 104, some privacy sensitive data may be able to be derived or inferred from the model parameters. In such implementations, one or more of encryption techniques, random noise techniques, and/or other security techniques can be added to the training process to obscure any inferable information.

As indicated above, server 104 can receive each local update from client device 102, and can aggregate the local updates to determine a global update to the model 106. In some implementations, server 104 can determine an average (e.g., a weighted average) of the local updates and determine the global update based at least in part on the average.

In some implementations, scaling or other techniques can be applied to the local updates to determine the global update. For instance, a local step size can be applied for each client device 102, the aggregation can be performed proportionally to various data partition sizes of client devices 102, and/or one or more scaling factors can be applied to the local and/or aggregated updates. It will be appreciated that various other techniques can be applied without deviating from the scope of the present disclosure.

Figure 2:
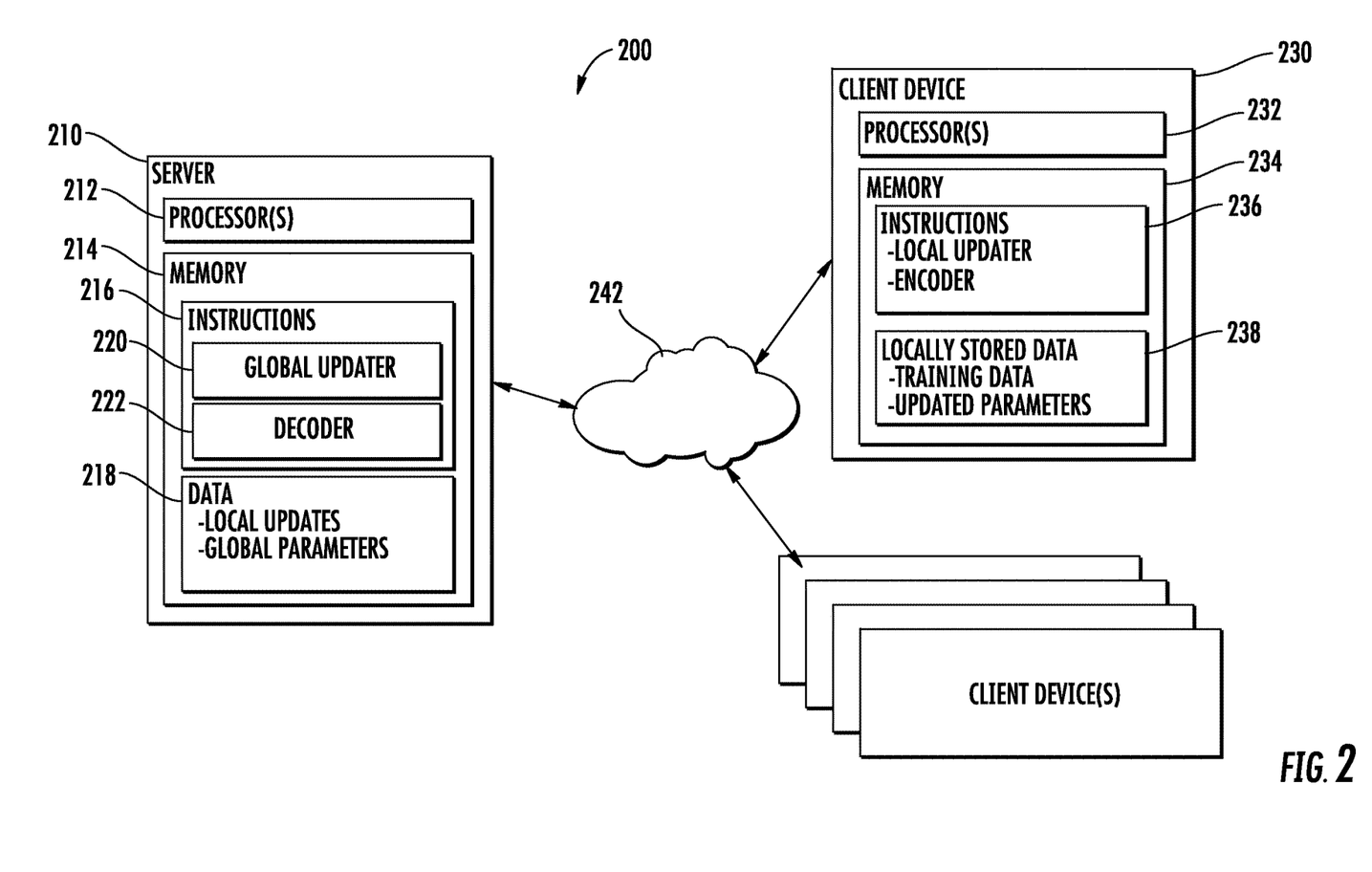
FIG. 2 depicts a block diagram of an example computing system according to example embodiments of the present disclosure.

FIG. 2 depicts an example computing system 200 that can be used to implement the methods and systems of the present disclosure. The system 200 can be implemented using a client-server architecture that includes a server 210 that communicates with one or more client devices 230 over a network 242. Thus, FIG. 2 provides an example system 200 that can implement the scheme illustrated by system 100 of FIG. 1.

The system 200 includes a server 210, such as a web server. The server 210 can be implemented using any suitable computing device(s). The server 210 can have one or more processors 212 and one or more memory devices 214. The server 210 can be implemented using one server device or a plurality of server devices. In implementations in which a plurality of devices are used, such plurality of devices can operate according to a parallel computing architecture, a sequential computing architecture, or a combination thereof.

The server 210 can also include a network interface used to communicate with one or more client devices 230 over the network 242. The network interface can include any suitable components for interfacing with one more networks, including for example, transmitters, receivers, ports, controllers, antennas, or other suitable components.

The one or more processors 212 can include any suitable processing device, such as a microprocessor, microcontroller, integrated circuit, logic device, or other suitable processing device. The one or more memory devices 214 can include one or more computer-readable media, including, but not limited to, non-transitory computer-readable media, RAM, ROM, hard drives, flash drives, or other memory devices. The one or more memory devices 214 can store information accessible by the one or more processors 212, including computer-readable instructions 216 that can be executed by the one or more processors 212.

The instructions 216 can be any set of instructions that when executed by the one or more processors 212, cause the one or more processors 212 to perform operations. For instance, the instructions 216 can be executed by the one or more processors 212 to implement a global updater 220. The global updater 220 can be configured to receive one or more local updates and to determine a global model based at least in part on the local updates.

The instructions 216 can further include instructions that cause the server 210 to implement a decoder 222. The decoder 222 can decode an update that has been encoded by a client device 230 (e.g., according to one of the encoding techniques discussed above such as subsampling, quantization, random rotation, etc.).

As shown in FIG. 2, the one or more memory devices 214 can also store data 218 that can be retrieved, manipulated, created, or stored by the one or more processors 212. The data 218 can include, for instance, local updates, global parameters, and other data. The data 218 can be stored in one or more databases. The one or more databases can be connected to the server 210 by a high bandwidth LAN or WAN, or can also be connected to server 210 through network 242. The one or more databases can be split up so that they are located in multiple locales.

The server 210 can exchange data with one or more client devices 230 over the network 242. Any number of client devices 230 can be connected to the server 210 over the network 242. Each of the client devices 230 can be any suitable type of computing device, such as a general purpose computer, special purpose computer, laptop, desktop, mobile device, navigation system, smartphone, tablet, wearable computing device, gaming console, a display with one or more processors, or other suitable computing device.

Similar to the server 210, a client device 230 can include one or more processor(s) 232 and a memory 234. The one or more processor(s) 232 can include, for example, one or more central processing units (CPUs), graphics processing units (GPUs) dedicated to efficiently rendering images or performing other specialized calculations, and/or other processing devices. The memory 234 can include one or more computer-readable media and can store information accessible by the one or more processors 232, including instructions 236 that can be executed by the one or more processors 232 and data 238.

The instructions 236 can include instructions for implementing a local updater configured to determine one or more local updates according to example aspects of the present disclosure. For example, the local updater can perform one or more training techniques such as, for example, backwards propagation of errors to re-train or otherwise update the model based on the locally stored training data. The local updater can be configured to perform structured updates, sketched updates, or other techniques. The local updater can be included in an application or can be included in the operating system of the device 230.

The instructions 236 can further include instructions for implementing an encoder. For example, the encoder can perform one or more of the encoding techniques described above (e.g., subsampling, quantization, random rotation, etc.).

The data 238 can include one or more training data examples to be used in solving one or more optimization problems. The training data examples of each client device 230 can be distributed unevenly among the client devices, such that no client device 230 includes a representative sample of the overall distribution of the training data examples.

The data 238 can further include updated parameters to be communicated to the server 210.

The client device 230 of FIG. 2 can include various input/output devices for providing and receiving information from a user, such as a touch screen, touch pad, data entry keys, speakers, and/or a microphone suitable for voice recognition.

The client device 230 can also include a network interface used to communicate with one or more remote computing devices (e.g. server 210) over the network 242. The network interface can include any suitable components for interfacing with one more networks, including for example, transmitters, receivers, ports, controllers, antennas, or other suitable components.

The network 242 can be any type of communications network, such as a local area network (e.g. intranet), wide area network (e.g. Internet), cellular network, or some combination thereof. The network 242 can also include a direct connection between a client device 230 and the server 210. In general, communication between the server 210 and a client device 230 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Example Methods

Figure 3:
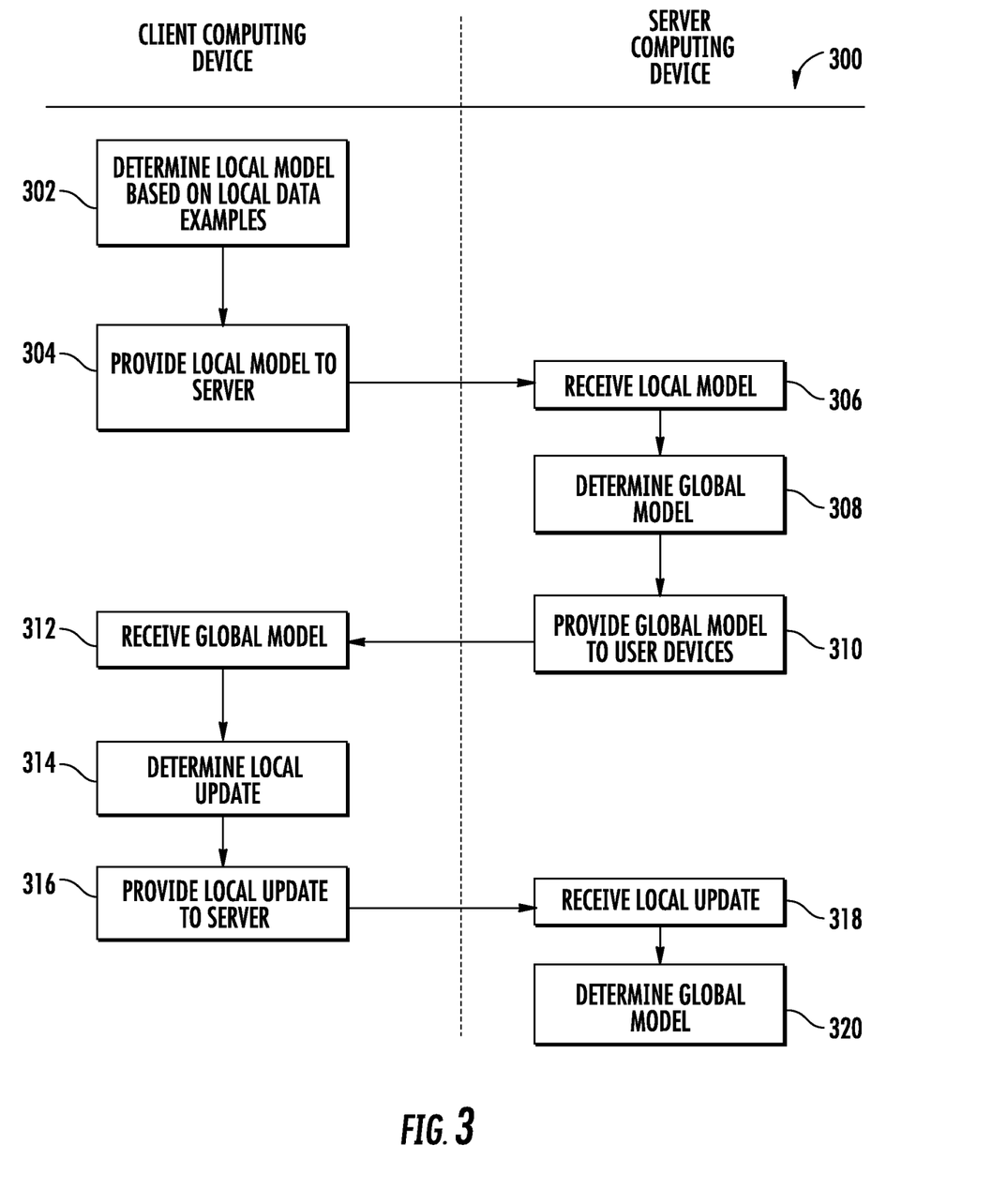
FIG. 3 depicts a flow chart diagram of an example method to perform communication efficient machine learning according to example embodiments of the present disclosure.

FIG. 3 depicts a flow diagram of an example method (300) of determining a global model according to example embodiments of the present disclosure. Method (300) can be implemented by one or more computing devices, such as one or more of the computing devices depicted in FIGS. 1 and/or 2. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), method (300) can include determining, by a client device, a local model based on one or more local data examples. In particular, the local model can be determined for a loss function using the one or more data examples. The data examples may be generated, for instance, through interaction of a user with the client device. In some implementations, the model may have been pre-trained prior to local training at (302). In some implementations, structured update, sketched update, or other techniques can be used at (302) to render the learned local model or local update communication efficient.

At (304), method (300) can include providing, by the client device, the local model to a server, and at (306), method (300) can include receiving, by the server, the local model. In some implementations, the local model or local update can be encoded or compressed prior to sending the local model or update to the server.

At (308), method (300) can include determining, by the server, a global model based at least in part on the received local model. For instance, the global model can be determined based at least in part on a plurality of local models provided by a plurality of client devices, each having a plurality of unevenly distributed data examples. In particular, the data examples may be distributed among the client devices such that no client device includes a representative sample of the overall distribution of data. In addition, the number of client devices may exceed the number of data examples on any one client device.

In some implementations, as part of the aggregation process, the server can decode each received local model or local update.

At (310), method (300) can include providing the global model to each client device, and at (312), method (300) can include receiving the global model.

At (314), method (300) can include determining, by the client device, a local update. In a particular implementation, the local update can be determined by retraining or otherwise updating the global model based on the locally stored training data. In some implementations, structured update, sketched update, or other techniques can be used at (314) to render the learned local model or local update communication efficient.

In some implementations, the local update can be determined based at least in part using one or more stochastic updates or iterations. For instance, the client device may randomly sample a partition of data examples stored on the client device to determine the local update. In particular, the local update may be determined using stochastic model descent techniques to determine a direction in which to adjust one or more parameters of the loss function.

In some implementations, a step size associated with the local update determination can be determined based at least in part on a number of data examples stored on the client device. In further implementations, the stochastic model can be scaled using a diagonal matrix, or other scaling technique. In still further implementations, the local update can be determined using a linear term that forces each client device to update the parameters of the loss function in the same direction.

At (316), method (300) can include providing, by the client device, the local update to the server. In some implementations, the local model or local update can be encoded prior to sending the local model or update to the server.

At (318), method (300) can include receiving, by the server, the local update. In particular, the server can receive a plurality of local updates from a plurality of client devices.

At (320), method (300) can include again determining the global model. In particular, the global model can be determined based at least in part on the received local update(s). For instance, the received local updates can be aggregated to determine the global model. The aggregation can be an additive aggregation and/or an averaging aggregation. In particular implementations, the aggregation of the local updates can be proportional to the partition sizes of the data examples on the client devices. In further embodiments the aggregation of the local updates can be scaled on a per-coordinate basis.

Any number of iterations of local and global updates can be performed. That is, method (300) can be performed iteratively to update the global model based on locally stored training data over time.

Figure 4:
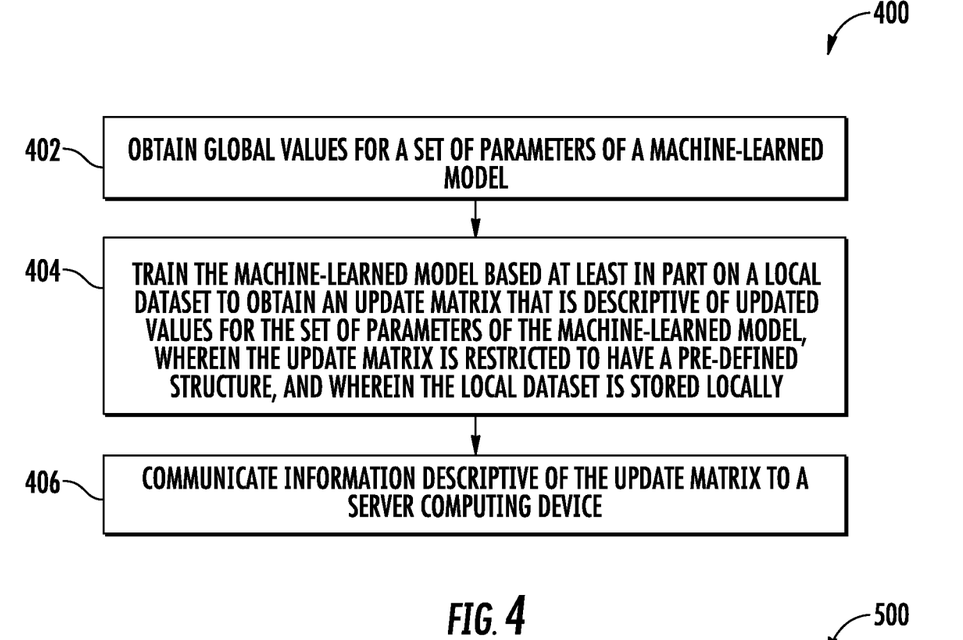
FIG. 4 depicts a flow chart diagram of an example method to perform communication efficient machine learning according to example embodiments of the present disclosure.

FIG. 4 depicts a flow chart diagram of an example method 400 to perform communication efficient machine learning according to example embodiments of the present disclosure. For example, method 400 can be performed by a client computing device.

At 402, a client computing device obtains global values for a set of parameters of a machine-learned model.

At 404, the client computing device trains the machine-learned model based at least in part on a local dataset to obtain an update matrix that is descriptive of updated values for the set of parameters of the machine-learned model. The update matrix is restricted to have a pre-defined structure. The local dataset is stored locally by the client computing device. In some implementations, the update matrix is descriptive of updated values for the set of parameters and/or differences between the updated values and the global values.

In some implementations, the update matrix is restricted to be a low-rank matrix.

In some implementations, training the machine-learned model at 404 can include defining, by the client computing device, the update matrix as a product of a first matrix and a second matrix. The first matrix can include fixed values and the second matrix can include optimizable variables. The client computing device can train the machine-learned model based at least in part on the local dataset to obtain the second matrix.

In some of such implementations, the method 400 can further include, prior to training the model at 404: generating the first matrix based at least in part on a seed and a pseudo-random number generator. Both the client computing device and a server computing device can have knowledge of the seed such that the first matrix is reproducible by the server computing device.

In some implementations, the update matrix is restricted to be a sparse matrix.

In some implementations, training the machine-learned model at 404 can include training the machine-learned model based at least in part on the local dataset such that updated values are determined only for a pre-selected portion of the set of parameters. In such implementations, the update matrix can be descriptive of only the updated values for the pre-selected portion of the set of parameters.

In some of such implementations, the method 400 can further include, prior to training the model at 404: generating a parameter mask that specifies which of the set of parameters are included in the pre-selected portion of the set of parameters. For example, generating the parameter mask can include generating, by the client computing device, the parameter mask based at least in part on a seed and a pseudo-random number generator, wherein both the client computing device and the server computing device have knowledge of the seed such that the parameter mask is reproducible by the server computing device.

At 406, the client computing device communicates information descriptive of the update matrix to the server computing device.

As one example, in implementations in which training the model at 404 includes optimizing a second matrix, communicating information descriptive of the update matrix at 406 can include communicating information descriptive of the second matrix to the server computing device.

Figure 5:
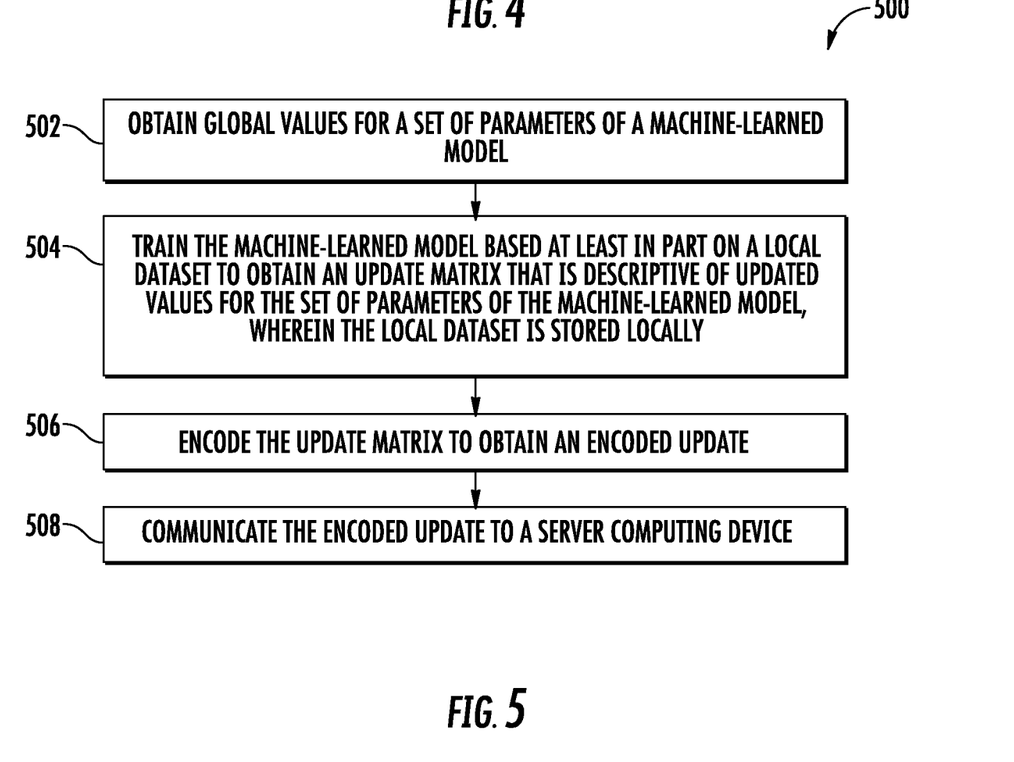
FIG. 5 depicts a flow chart diagram of an example method to perform communication efficient machine learning according to example embodiments of the present disclosure.

FIG. 5 depicts a flow chart diagram of an example method 500 to perform communication efficient machine learning according to example embodiments of the present disclosure. For example, method 500 can be performed by a client computing device.

At 502, a client computing device obtains global values for a set of parameters of a machine-learned model.

At 504, the client computing device trains the machine-learned model based at least in part on a local dataset to obtain an update matrix that is descriptive of updated values for the set of parameters of the machine-learned model. The local dataset is stored locally by the client computing device. In some implementations, the update matrix is descriptive of updated values for the set of parameters and/or differences between the updated values and the global values.

At 506, the client computing device encodes the update matrix to obtain an encoded update.

In some implementations, encoding the update matrix at 506 can include subsampling the update matrix to obtain the encoded update. In some of such implementations, subsampling the update matrix can include: generating a parameter mask that specifies a portion of the set of parameters to be sampled; and subsampling the update matrix according to the parameter mask.

In some of such implementations, generating the parameter mask can include generating the parameter mask based at least in part on a seed and a pseudo-random number generator, wherein both the client computing device and a server computing device have knowledge of the seed such that the parameter mask is reproducible by the server computing device.

In some implementations, encoding the update matrix at 506 can include probabilistically quantizing one or more values included in the update matrix. In some implementations, encoding the update matrix at 506 can include performing probabilistic binary quantization for one or more values included in the update matrix to change each of the one or more values to a maximum value included in the update matrix or a minimum value included in the update matrix. In some implementations, encoding the update matrix at 506 can include: defining a plurality of intervals between a maximum value included in the update matrix and a minimum value included in the update matrix; and probabilistically changing each of one or more values included in the update matrix to a local interval maximum or a local interval maximum.

In some implementations, encoding the update matrix at 506 can include multiplying a vector of the update matrix by a rotation matrix to obtain a rotated update. In some of such implementations, encoding the update matrix can further include probabilistically quantizing one or more values included in the rotated update. In some implementations, the rotation matrix can be a structured rotation matrix that does not require complete generation of the rotation matrix by the client computing device.

At 508, the client computing device communicates the encoded update to the server computing device. The server computing device can decode the encoded update.

Example Experiments

Example experiments were conducted using federated learning to train deep neural networks for the CIFAR-10 image classification task (see, Krizhevsky. Learning multiple layers of features from tiny images. Technical report, 2009). There are 50,000 training examples, which were partitioned into 100 clients each containing 500 training examples. The model architecture was taken from the TensorFlow tutorial (Tensorflow convolutional neural networks tutorial. http://www.tensorflow.org/tutorials/deep_cnn, 2016), which consists of two convolutional layers followed by two fully connected layers and then a linear transformation layer to produce logits, for a total of over 1e6 parameters. While this model is not the state-of-the-art, it is sufficient for the goal of evaluating the compression methods described herein, rather than achieving the best possible accuracy on this task.

The Federated Averaging algorithm (McMahan et al. Federated Learning of deep networks using model averaging. arXiv: 1602.05629, 2016) was employed, which significantly decreases the number of rounds of communication required to train a good model. However, the techniques are expected to show a similar reduction in communication costs when applied to synchronized SGD. For Federated Averaging, on each round 10 clients were selected at random, each of which performs 10 epochs of SGD with a learning rate of η on their local dataset using minibatches of 50 images, for a total of 100 local updates. From this updated model the deltas for each layer of $H_t^i$ were computed.

Table 1 provides low rank and sampling parameters for the example CIFAR experiments. The Sampling Probabilities column gives the fraction of elements uploaded for the two convolutional layers and the two fully-connected layers, respectively; these parameters are used by StructMask, SketchMask, and SketchRotMask. The Low Rank column gives the rank restriction k for these four layers. The final softmax layer is small, so updates to it were not compressed.

TABLE 1

| | (Low) Rank | Sampling Probabilities | Model Size | Reduction |
|---|---|---|---|---|
| Full Model (baseline) | 64, 64, 384, 192 | 1, 1, 1, 1 | 4.075 MB | — |
| Medium subsampling | 64, 64, 12, 6 | 1, 1, 0.03125, 0.03125 | 0.533 MB | 7.6x |
| High subsampling | 8, 8, 12, 6 | 0.125, 0.125, 0.0.125, 0.0.123 | 0.175 MB | 23.3x |

Figure 6:
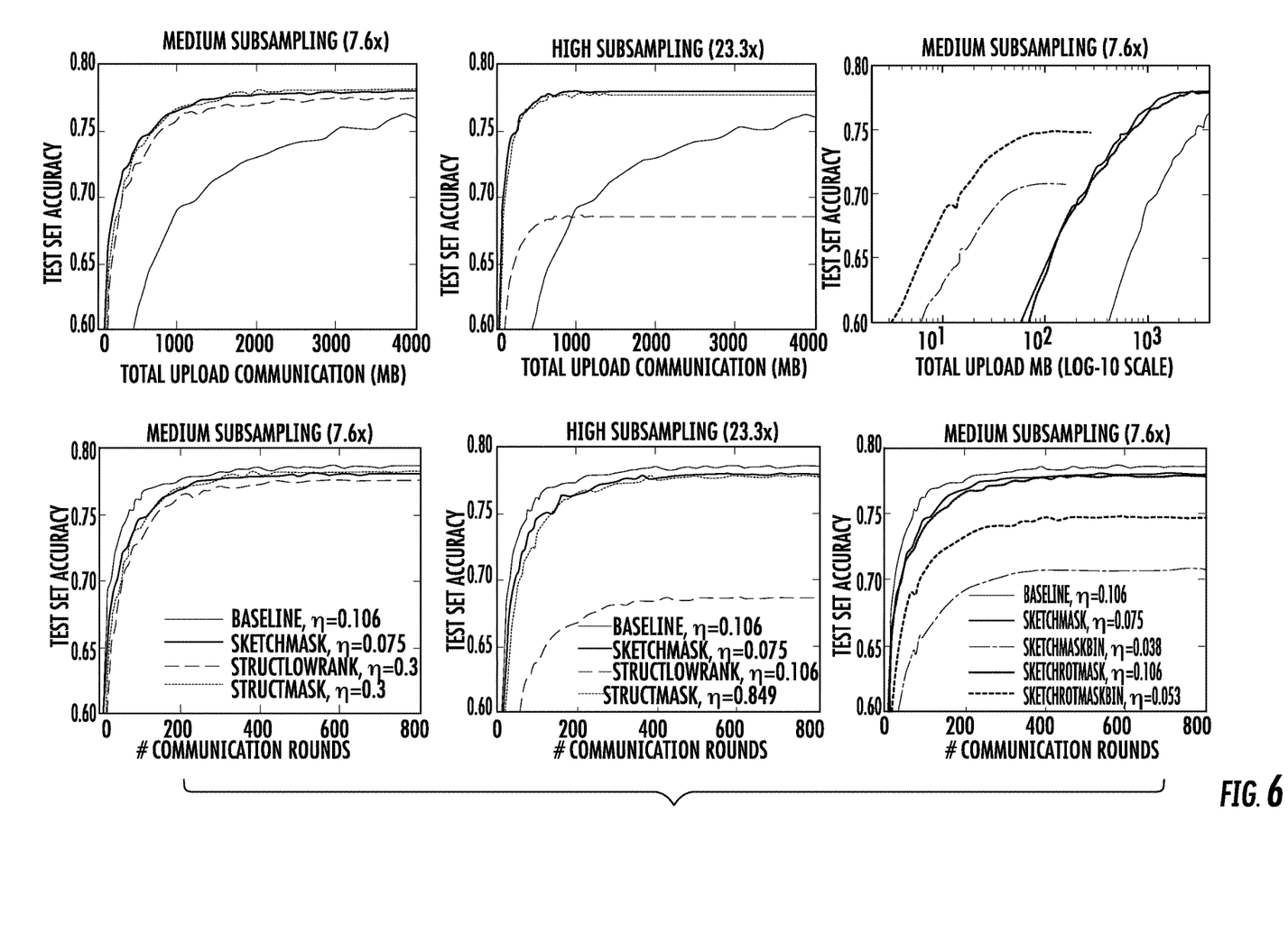
FIG. 6 depicts plots of example experimental results according to example embodiments of the present disclosure.

FIG. 6 depicts plots of example non-quantized results (left and middle columns), and results including binary quantization (dashed lines SketchRotMaskBin and SketchMaskBin, right column). Note the x-axis is on a log scale for top-right plot. Over 70% accuracy was achieved with fewer than 100 MB of communication.

Medium and high low-rank/sampling parameterizations were defined that result in the same compression rates for both approaches, as given in Table 1. The left and center columns of FIG. 6 present non-quantized results for test-set accuracy, both as a function of the number of rounds of the algorithm, and the total number of megabytes uploaded. For all experiments, learning rates were tuned using a multiplicative grid of resolution V2 centered at 0.15. Results for the learning rate are plotted with the best median accuracy over rounds 400-800. A multiplicative learning-rate decay of 0.988 was used, which was selected by tuning only for the baseline algorithm.

For medium subsampling, all three approaches provide a dramatic improvement in test set accuracy after a fixed amount of bandwidth usage; the lower row of plots shows little loss in accuracy as a function of the number of update rounds with the exception that the StructLowRank approach performs poorly for the high subsampling parameters.

The right two plots in FIG. 6 give results for SketchMask and SketchRotMask, with and without binary quantization; only the medium subsampling regime is considered, which is representative. Observe that (as expected) introducing the random rotation without quantization has essentially no effect. However, binary quantization dramatically decreases the total communication cost, and further introducing the random rotation significantly speeds convergence, and also allows convergence to a higher level of accuracy. A reasonable model is able to be learned (70% accuracy) in only ~100 MB of communication, two orders of magnitude less than the baseline.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for communication efficient machine learning, the method comprising:
    obtaining, by a client computing device, global values for a set of parameters of a machine-learned model;
    training, by the client computing device, the machine-learned model based at least in part on a local dataset to obtain an update matrix that is descriptive of updated values for the set of parameters of the machine-learned model, wherein the update matrix is restricted to be a low-rank matrix, and wherein the local dataset is stored locally by the client computing device; and
    communicating, by the client computing device, information descriptive of the update matrix to a server computing device for use by the server computing device in computation of a global update to the machine-learned model, wherein:
    training, by the client computing device, the machine-learned model based at least in part on the local dataset to obtain the update matrix comprises:
        defining, by the client computing device, the update matrix as a product of a first matrix and a second matrix, wherein the first matrix comprises fixed values and the second matrix comprises optimizable variables, and wherein the fixed values of the first matrix are known to the server computing device; and
        training, by the client computing device, machine-learned model based at least in part on the local dataset to obtain the second matrix; and
    communicating, by the client computing device, information descriptive of the update matrix to the server computing device comprises communicating, by the client computing device, information descriptive of the second matrix to the server computing device without sending the first matrix from the client computing device to the server computing device.

2. The computer-implemented method of claim 1, further comprising, prior to training, by the client computing device, the machine-learned model:
    generating, by the client computing device, the first matrix based at least in part on a seed and a pseudo-random number generator, wherein both the client computing device and the server computing device have knowledge of the seed such that the first matrix is reproducible by the server computing device.

3. The computer-implemented method of claim 1, wherein the update matrix is restricted to be a sparse matrix.

4. The computer-implemented method of claim 1, wherein training, by the client computing device, the machine-learned model based at least in part on the local dataset comprises training, by the client computing device, the machine-learned model based at least in part on the local dataset such that updated values are determined only for a pre-selected portion of the set of parameters, the update matrix descriptive of only the updated values for the pre-selected portion of the set of parameters.

5. The computer-implemented method of claim 4, further comprising, prior to training, by the client computing device, the machine-learned model:
    generating, by the client computing device, a parameter mask that specifies which of the set of parameters are included in the pre-selected portion of the set of parameters.

6. The computer-implemented method of claim 5, wherein generating, by the client computing device, the parameter mask comprises generating, by the client computing device, the parameter mask based at least in part on a seed and a pseudo-random number generator, wherein both the client computing device and the server computing device have knowledge of the seed such that the parameter mask is reproducible by the server computing device.

7. The computer-implemented method of claim 1, wherein the update matrix describes the updated values for the set of parameters or respective differences between the updated values and the global values.

8. A client computing device, comprising:
   at least one processor; and
   at least one non-transitory computer-readable medium that stores instructions that, when executed by the at least one processor, cause the client computing device to perform operations comprising:
   obtaining global values for a set of parameters of a machine-learned model;
   training the machine-learned model based at least in part on a local dataset to obtain an update matrix that is descriptive of updated values for the set of parameters of the machine-learned model, wherein the update matrix is restricted to be a low-rank matrix, and wherein the local dataset is stored locally by the client computing device; and
   communicating information descriptive of the update matrix to a server computing device for use by the server computing device in computation of a global update to the machine-learned model, wherein:
   training the machine-learned model based at least in part on the local dataset to obtain the update matrix comprises:
      defining the update matrix as a product of a first matrix and a second matrix, wherein the first matrix comprises fixed values and the second matrix comprises optimizable variables, and wherein the fixed values of the first matrix are known to the server computing device; and
      training machine-learned model based at least in part on the local dataset to obtain the second matrix; and
   communicating information descriptive of the update matrix to the server computing device comprises communicating, by the client computing device, information descriptive of the second matrix to the server computing device without sending the first matrix from the client computing device to the server computing device.

9. At least one non-transitory computer-readable medium that stores instructions that, when executed by a client computing device, cause the client computing device to perform operations comprising:
   obtaining global values for a set of parameters of a machine-learned model;
   training the machine-learned model based at least in part on a local dataset to obtain an update matrix that is descriptive of updated values for the set of parameters of the machine-learned model, wherein the update matrix is restricted to be a low-rank matrix, and wherein the local dataset is stored locally by the client computing device; and
   communicating information descriptive of the update matrix to a server computing device for use by the server computing device in computation of a global update to the machine-learned model, wherein:
   training the machine-learned model based at least in part on the local dataset to obtain the update matrix comprises:
      defining the update matrix as a product of a first matrix and a second matrix, wherein the first matrix comprises fixed values and the second matrix comprises optimizable variables, and wherein the fixed values of the first matrix are known to the server computing device; and
      training machine-learned model based at least in part on the local dataset to obtain the second matrix; and
   communicating information descriptive of the update matrix to the server computing device comprises communicating, by the client computing device, information descriptive of the second matrix to the server computing device without sending the first matrix from the client computing device to the server computing device.

* * * * *